US012768627B2

(12) United States Patent
Behar et al.

(10) Patent No.: US 12,768,627 B2

(45) Date of Patent: Oct. 20, 2026

(54) CONNECTION SYSTEM

(71) Applicant: Israel Aerospace Industries Ltd., Lod (IL)

(72) Inventors: Baruch Behar, Lod (IL); Ziv Golan, Lod (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 18/571,376

(22) PCT Filed: Jun. 15, 2022

(86) PCT No.: PCT/IL2022/050642

§ 371 (c)(1),
(2) Date: Dec. 18, 2023

(87) PCT Pub. No.: WO2022/269597

PCT Pub. Date: Dec. 29, 2022

(65) Prior Publication Data

US 2024/0286769 A1 Aug. 29, 2024

(30) Foreign Application Priority Data

Jun. 21, 2021 (IL) .......................................... 284282

(51) Int. Cl.
*B64G 1/64* (2006.01)
*F42B 15/38* (2006.01)

(52) U.S. Cl.
CPC .............. *F42B 15/38* (2013.01); *B64G 1/642* (2023.08)

(58) Field of Classification Search
CPC ........ F16B 7/0426; F24B 15/38; F42B 15/36; B64G 1/6455; B64G 1/642; B64G 1/641; B64G 1/645; B64G 1/6457; B64G 1/228
(Continued)

(56) References Cited

U.S. PATENT DOCUMENTS 3,111,900 A 11/1963 Fitton et al.
3,409,316 A 11/1968 Jewell
(Continued)

FOREIGN PATENT DOCUMENTS

EP 0768241 A1 4/1997
GB 650218 A 2/1951
JP 2017-528374 A * 9/2017 ............... B64G 1/64

OTHER PUBLICATIONS

"Expanding Tube Assembly | XTA", Last accessed Jun. 6, 2021 at: https://psemc.com/products/expanding-tube-assembly/?amp=1, pp. 1-4.

(Continued)

*Primary Examiner* — Magdalena Topolski
*Assistant Examiner* — Shanna Danielle Glover
(74) *Attorney, Agent, or Firm* — Ballard Spahr LLP

(57) ABSTRACT

A connection system is provided for releasably connecting a first component and a second component in a first direction parallel to a reference longitudinal axis, including one or more locking devices and an actuator. Each locking device has a geometrically locked configuration and an unlocked configuration. In the geometrically locked configuration the locking device is capable of reversibly geometrically locking together the first component and the second component in a mutually clamped relationship along the first direction, each locking device comprising at least two linkage elements pivotably mounted to one another about a common clamp axis. The actuator device is configured for transitioning each locking device from the geometrically locked configuration to the unlocked configuration by selectively applying to each respective locking device an unlocking force directly to the respective linkage elements at the respective common clamp axis, in a second direction parallel to a reference transverse axis.

19 Claims, 11 Drawing Sheets

(58) Field of Classification Search
USPC .................................. 102/378, 377; 89/1.14
See application file for complete search history.

(56) References Cited

U.S. PATENT DOCUMENTS

| | | | | |
|---|---|---|---|---|
| 4,120,519 | A | 10/1978 | Bridges | |
| 4,685,376 | A | 8/1987 | Noel et al. | |
| 4,879,941 | A * | 11/1989 | Repe | F42B 12/60 102/393 |
| 5,005,876 | A | 4/1991 | Fahl | |
| 5,109,749 | A | 5/1992 | Olcer | |
| 5,248,233 | A * | 9/1993 | Webster | F16B 31/007 102/377 |
| 5,734,492 | A * | 3/1998 | Chung | G02B 26/0858 359/254 |
| 6,298,786 | B1 * | 10/2001 | Grosskrueger | B64G 1/641 102/377 |
| 6,650,212 | B1 * | 11/2003 | Weems | E05B 47/0002 335/285 |
| 6,820,559 | B1 | 11/2004 | Comtesse | |
| 7,367,738 | B2 | 5/2008 | Cleveland | |
| 8,607,705 | B2 * | 12/2013 | Golden | F42B 15/38 102/377 |
| 10,377,510 | B1 * | 8/2019 | Riskas | B64G 1/64 |
| 2003/0196544 | A1 | 10/2003 | Comtesse | |
| 2005/0103220 | A1 * | 5/2005 | Cleveland | F42B 15/36 102/378 |
| 2016/0347481 | A1 | 12/2016 | Keshtkar et al. | |

OTHER PUBLICATIONS

Choi, et al., "Development of a Numerical Model for an expanding Tube with Linear Explosive Using AUTODYN", Advances in Structural Health Managemet and Composite Structure 2012, vol. 2014. https://doi.org/10.1155/2014/436156, Mar. 2014, pp. 1-17.

Li, et al., "Dynamic-Envelope Analysis of Clamp-Band Joint Considering Pyroshock of Satellite Separation", https://www.researchgate.net/figure/Schematic-of-satellite-separation_fig3_266733877/amp, Sep. 2014, pp. 1-5.

Suresh, et al., "Integrated Design for Space Transportation System", Last Accessed on Jun. 6, 2021 at: https://link.springer.com/chapter/10.1007/978-81-322-2532-4_13, 2015, pp. 539-580.

* cited by examiner

CONNECTION SYSTEM

TECHNOLOGICAL FIELD

The presently discloses subject matter relates to systems for releasably connecting together two components, in particular for releasably connecting together two stages of a rocket launch vehicle or the like.

BACKGROUND

There are a variety of systems in which it is necessary to releasably join or connect two elements together.

In one such class of systems relating to aerospace applications, it is often necessary to releasably connect together a lower stage from a higher stage of a rocket launch vehicle, once the lower stage has terminated its part of the mission. In many such cases there it is often also necessary to releasably connect together a payload to a stage of the launch vehicle, and to release the payload at some point in the launch process, and/or to detach a fairing that covers the payload for the initial stages of the launch.

In many such applications, clampbands are often used for temporarily joining the various components together, and the clampbands are disengaged from the components when separation of the components is required. Common examples of such clampbands are based on Marman clamps.

Other solutions include a system of pyrotechnic bolts that hold the components together, and that are explosively sheared when separation of the components is required.

By way of non-limiting example, U.S. Pat. No. 3,111,900 discloses a locking means for holding a vehicle and a rocket stage in assembled relation, the vehicle and stage having cooperating sleeves thereon, the sleeves having end surfaces in endwise engagement to hold the vehicle and stage in predetermined axial relation.

Also by way of non-limiting example, U.S. Pat. No. 3,409,316 discloses a coupling for use with flexible pipe or other type conduit, wherein the coupling mechanism is a toggle actuated cam rotated inwardly and axially onto an adapter groove forcing the adapter concentrically within a coupler.

Also by way of non-limiting example, U.S. Pat. No. 4,120,519 discloses a readily separable fastening structure for holding a pair of cylindrical sections together in axial alignment, including annular rim members attached to the inside surfaces near the ends of the cylindrical members, one of which has an outwardly extending flange spaced from the end of its corresponding cylindrical member to form an annular groove and the other of which is adapted to telescope within the first such rim member, the other such rim member also including an inwardly extending flange. A plurality of spaced members having spring fingers are attached to the outside of the second cylindrical member and extending beyond the end thereof, the spring fingers each having an inwardly extending ridge and a groove on the outside of the ridge. A small diameter cable is positioned in said grooves, and tensioning members are included for pulling said cable tightly around said fingers to pull the inwardly extending ridges into said annular groove to lock the cylindrical members together. A pyro device is positioned to cut the cable to effect automated sequencing separation of the cylindrical members.

Also by way of non-limiting example, U.S. Pat. No. 5,005,876 discloses a quick connect-disconnect coupling comprising a coupler joined to a standardized adapter to provide for fluid flow between first and second conduits.

Locking mechanism comprises a four bar linkage which minimizes the manual effort required to connect and disconnect the coupler from the adapter. An over the center relation of the four bar linkage locks the coupler in coupled relation to the adapter to minimize inadvertent decoupling.

Also by way of non-limiting example, U.S. Pat. No. 5,109,749 discloses an explosively separable structure having two weakened areas in each of the structural members to be separated, one where the separation is to occur and the other spaced from the first. The second weakened area is stronger than the first, and the explosive charge is positioned between the two. Upon detonation of the explosive charge, the structural member bends in the stronger area after being severed primarily by shear and bending in the weaker one.

In the embodiment disclosed, the areas of weakness are formed by a pair of notches or grooves positioned symmetrically with respect to each other on opposite sides of the structural member.

Also by way of non-limiting example, EP 0768241 discloses fastening and separating system for satellites. It comprises a fastening piece which is screwed to the upper ring of the adaptor of the launch rocket, a tensioning strip consisting of a two-part metal band, curved metal pieces for fastening the satellite which have a thin-walled cylindrical body with a metal rotational shaft in its lower part formed by several lugs and which rest via their upper part on the lower ring of the satellite, surrounding it and pressing on it, and pressing cams which each have two rotational shafts, one coinciding with that of said metal pieces and the other shared with said piece.

Also by way of non-limiting example, U.S. Pat. No. 6,820,559 discloses a temporary connection of two elements that is ensured by U-shaped connecting components held in place by a moving part. A pyrotechnic composition is housed between two shoulders situated respectively on the first of the elements and on the moving part. Igniting the pyrotechnic composition causes the moving part to slide over the first element. The connecting components are released and the connection between the elements is eliminated without breaking any parts.

Also by way of non-limiting example, U.S. Pat. No. 7,367,738 discloses an apparatus and method for releasably joining first and second elements, including a retaining member mounted to one of the elements and a reshapeable tube near the retaining member. The reshapeable tube has at least two states, an at least partially collapsed state and an at least partially expanded state. As such, the retaining member joins the elements while the reshapeable tube is in the at least partially collapsed state. Furthermore, the retaining member releases the other element while the reshapeable tube is in the at least partially expanded state, which deflects the retaining member. Thus, because components of the apparatus are not broken during the release of the elements, the amount of constrained or potential energy that is released when the retaining member releases the elements is substantially reduced or eliminated, which protects the elements from being damaged during the release.

Also by way of non-limiting example, U.S. Pat. No. 4,685,376 discloses an explosively operated, confined linear explosive separation joint. The joint features a one-piece female member of a clevis type shape with shear lip grooves located on the outside surface of the clevis generally aligned with the fillet formed between the sidewall and the bottom of the opening in the clevis. The explosive means is contained in the bottom of the clevis portion with the male portion of the joint slideably nested in the clevis opening abutting the explosive. Shear lip groove alignment with the corner radius or fillet formed at the bottom of the clevis and the stiffer structure adjacent to the break point combine to ensure optimum use of the explosive energy and produce a joint which fails primarily in shear rather than tension, taking advantage of the materials weakest property.

GENERAL DESCRIPTION

According to a first aspect of the presently disclosed subject matter, there is provided a connection system for releasably connecting a first component and a second component in a first direction parallel to a reference longitudinal axis, including one or more locking devices and an actuator. Each locking device has a geometrically locked configuration and an unlocked configuration. In the geometrically locked configuration the locking device is capable of reversibly geometrically locking together the first component and the second component in a mutually clamped relationship along the first direction, each locking device comprising at least two linkage elements pivotably mounted to one another about a common clamp axis. The actuator device is configured for transitioning each locking device from the geometrically locked configuration to the unlocked configuration by selectively applying to each respective said locking device an unlocking force directly to the respective linkage elements at the respective common clamp axis, in a second direction parallel to a reference transverse axis.

According to a first aspect of the presently disclosed subject matter, there is also provided a connection system for releasably connecting a first component and a second component with respect to one another in a first direction parallel to a reference longitudinal axis, comprising:

at least one locking device having a geometrically locked configuration and an unlocked configuration, wherein in the geometrically locked configuration the locking device is capable of reversibly geometrically locking together the first component and the second component in a mutually clamped relationship along said first direction, each said locking device comprising at least two linkage elements pivotably mounted to one another about a common clamp axis, and wherein in said geometrically locked configuration said at least two linkage elements are in an over-center position with respect to said at least two linkage elements;

an actuator device configured for transitioning said at least one locking device from the geometrically locked configuration to the unlocked configuration by selectively applying to each respective said locking device an unlocking force directly to the respective said linkage elements at the respective common clamp axis, in a second direction parallel to a reference transverse axis, whereby to cause the respective at least two linkage elements to be released from the respective over-center position and into a respective under-center position, and wherein said reference longitudinal axis and said reference transverse axis are non-parallel with respect to one another.

For example, the reference transverse axis is generally orthogonal to the reference longitudinal axis. Alternatively, for example, the reference transverse axis is generally non-parallel spatial disposition with respect to the reference longitudinal axis. For example, the reference transverse axis can be inclined with respect to the reference longitudinal axis at an angle within any one of the following ranges: 300 to 60°; 300 to 45°; 450 to 60°.

Additionally or alternatively, for example, said actuator device is mechanically distinct from said at least one locking device.

Additionally or alternatively, for example, in said geometrically locked configuration, the actuator device is mechanically uncoupled with respect to the at least one said locking device.

Additionally or alternatively, for example, in said geometrically locked configuration, the actuator device is a mutually abutting relationship with respect to the at least one said locking device.

Additionally or alternatively, for example, in said geometrically locked configuration, the actuator device is a transverse spaced relationship with respect to the at least one said locking device.

Additionally or alternatively, for example, said actuator device comprises a tube element configured for shape morphing from a first tube configuration having a first tube dimension parallel to said second direction, and a second tube configuration having a second tube dimension parallel to said second direction, wherein said second tube dimension is significantly greater than said first tube dimension. For example, said tube element is in transverse facing relationship with respect to the respective clamp axis. Additionally or alternatively, for example, the actuator device comprises an actuator arm operatively coupled to the tube element, and wherein in said geometrically locked configuration the actuator arm is abutting with, or in a transverse spaced relationship with respect to, the respective clamp axis.

Additionally or alternatively, for example, said first tube dimension and said second tube dimension correspond to parts of the tube element at or in proximity to the reference transverse axis.

Additionally or alternatively, for example, in said first tube configuration, the tube element has a generally flattened circle cross-sectional shape, and wherein in wherein in said second tube configuration, the tube element has a generally circular cross-sectional shape.

Additionally or alternatively, for example, the actuator device is configured for providing a said second tube dimension that is sufficient to concurrently displace the respective said linkage elements from the respective said over-center position to the respective said under-center position.

Additionally or alternatively, for example, the actuator device is configured for providing a said second tube dimension in a predetermined short time sufficient to concurrently cause the respective said linkage elements to transit from the respective said over-center position to the respective said under-center position.

Additionally or alternatively, for example, the actuator device comprises a pyrotechnic system for selectively morphing the shape of the tube element from the first tube configuration to the second tube configuration responsive to a suitable activation command. For example, said tube element comprises an internal lumen, and wherein said pyrotechnic system comprises a linear explosive assembly accommodated in said internal lumen.

Additionally or alternatively, for example, each said locking device comprising a multi-bar linkage assembly comprising said at least two linkage elements, including a first said linkage element and a second said linkage element pivoted with respect to one another about the respective said common clamp axis, the first linkage element having a free first end configured for pivotably coupling with the first component about a first clamp axis, and the second linkage element having a free second end configured for pivotably coupling with the second component about a second clamp axis, wherein in said geometrically locked configuration, said second clamp axis is at said over-center position defined on a second transverse side of an imaginary line orthogonally intersecting said first clamp axis and said common clamp axis, and wherein in said unlocked configuration said second clamp axis is at said under-center position defined on a first transverse side of said imaginary line, wherein said first side and said second side are on opposite transverse sides of said imaginary line. For example, said first clamp axis, said second clamp axis and said third clamp axis are parallel to one another. Additionally or alternatively, for example, the connection system further comprises a mechanical stop, configured for limiting pivoting of the first linkage element with respect to the second linkage element about said common pivot axis. Additionally or alternatively, for example, said first linkage element comprises a first rod, wherein the second linkage element comprises a second rod, wherein the first rod is pivotably mounted with respect to the second rod at said common clamp axis via a common pivot pin. For example, said free first end has a convex first curved cross section, and wherein said free second end has a convex second curved cross section, wherein the first curved cross section is complementary to a first concave abutment shoulder provided in the first component, and wherein the second curved cross section is complementary to a second concave abutment shoulder provided in the second component. Additionally or alternatively, for example, said first linkage element comprises a first plurality of first rods in mutually parallel configuration, wherein the second linkage element comprises a second plurality of second rods in mutually parallel configuration, wherein the first plurality of said first rods is pivotably mounted with respect to the plurality of said second rods at said common clamp axis via a common pivot pin. For example, said first rods of said first plurality are rigidly joined to one another in the respective said mutually parallel configuration.

Additionally or alternatively, for example, said second rods of said second plurality are rigidly joined to one another in the respective said mutually parallel configuration.

Additionally or alternatively, for example, said free first end has a convex first curved cross section, and wherein said free second end has a convex second curved cross section, wherein the first curved cross section is complementary to a first concave abutment shoulder provided in the first component, and wherein the second curved cross section is complementary to a second concave abutment shoulder provided in the second component.

Additionally or alternatively, for example, said first rods have a first axial length, defined between said common axis and said first axis, and wherein said first axial length is selectively adjustable.

Additionally or alternatively, for example, said first rods are configured for enabling selectively adjusting a clamping force between the first pivot axis and the second pivot axis.

Additionally or alternatively, for example, said first plurality of said first rods consists of two said first rods, and wherein said second plurality of second rods consist of three second rods.

Additionally or alternatively, for example, at least in said over-center position, said second clamp axis is intermediately positioned with respect to said first clamp axis and said common clamp axis. Alternatively, for example, at least in said over-center position, said common clamp axis is intermediately positioned with respect to said first clamp axis and said second clamp axis.

Additionally or alternatively, for example, the connection system further comprises a restrainer configured for mechanically coupling the at least one locking device to only one of the first component or the second component.

Additionally or alternatively, for example, the connection system comprises a plurality of said locking devices, wherein all the locking devices of said plurality are operatively coupled with respect to one said actuator device.

According to a second aspect of the presently disclosed subject matter there is provided an assembly comprising a first component, a second component and a connection system as defined herein regarding the first aspect of the presently disclosed subject matter, wherein the first component and the second component are releasably clamped to one another via said connection system.

For example, the assembly comprises a plurality of said locking devices, wherein all the locking devices are operatively coupled with respect to one said actuator device.

Additionally or alternatively, for example, said first component comprises a concave first abutment shoulder configured for enabling each said free first end to be pivotably mounted thereto about the respective said first clamp axis, and wherein said second component comprises a concave second abutment shoulder configured for enabling each said free second end to be pivotably mounted thereto about the respective said second clamp axis.

Additionally or alternatively, for example, at least one of said first component and said second component is cylindrical.

Additionally or alternatively, for example, at least one of said first component and said second component is frustro conical.

Additionally or alternatively, for example, said first component and said second component are in the form of one or the other of two fairing parts of a fairing.

Additionally or alternatively, for example, said first component is stage of a rocket launch vehicle, and wherein said second component is an adjacent payload carried by the rocket launch vehicle. Alternatively, for example, said first component is one stage of a rocket launch vehicle, and wherein said second component is an adjacent stage of the rocket launch vehicle. Alternatively, for example, said first component is one fairing part of a fairing of a rocket launch vehicle, and wherein said second component is an adjacent fairing part of the fairing carried by the rocket launch vehicles.

Additionally or alternatively, for example, said reference longitudinal axis is coaxial or parallel to a central longitudinal axis of the rocket launch vehicle, or to a common central longitudinal axis of adjacent said stages, or to a central longitudinal axis of one of said stages.

Additionally or alternatively, for example, said reference longitudinal axis is orthogonal to a central longitudinal axis of the rocket launch vehicle or to a central longitudinal axis of the fairing.

According to a third aspect of the presently disclosed subject matter there is provided a rocket launch vehicle, for example a multi-stage rocket launch vehicle, including at least two stages, including one said stage comprising a first component, and an adjacent said stage comprising a second component, the multi-stage rocket launch vehicle further comprising a connection system as defined herein regarding the first aspect of the presently disclosed subject matter, wherein the connection system releasably clamps together the at least two stages to one another.

For example, said reference longitudinal axis is coaxial or parallel to a central longitudinal axis of the rocket launch vehicle, or to a common central longitudinal axis of at least one said stage.

According to the third aspect of the presently disclosed subject matter there is provided a rocket launch vehicle including at least one stage comprising said first component, and a payload comprising a second component, the rocket launch vehicle further comprising a connection system as defined herein regarding the first aspect of the presently disclosed subject matter, wherein the connection system releasably clamps together the payload and the stage.

For example, said reference longitudinal axis is coaxial or parallel to a central longitudinal axis of the rocket launch vehicle, or to a common central longitudinal axis of at least one said stage.

According to the third aspect of the presently disclosed subject matter there is provided a rocket launch vehicle including at least one fairing portion comprising said first component, and a second fairing portion comprising a second component, the rocket launch vehicle further comprising a connection system as defined herein regarding the first aspect of the presently disclosed subject matter, wherein the connection system releasably clamps together the first fairing portion and the second fairing portion.

For example, said reference longitudinal axis is coaxial or parallel to a central longitudinal axis of the rocket launch vehicle, or to a common central longitudinal axis of at least one said stage.

Alternatively, for example, said reference longitudinal axis is orthogonal to a central longitudinal axis of the rocket launch vehicle or to a central longitudinal axis of the fairing.

According to a fourth aspect of the presently disclosed subject matter there is provided a method for reversibly connecting a first component to a second component, comprising:

(a) providing a connection system as defined herein regarding the first aspect of the presently disclosed subject matter;

(b) engaging the at least one locking device with the first component and the second component, and manipulating the at least one locking device to attain the respective locked configuration.

For example, the method according further comprises activating the actuator device to thereby provide the unlocking force to the at least one locking device, thereby transitioning the at least one locking device to the respective unlocked configuration, and thereby disengaging the first component from the second component.

A feature of at least one example of the presently discloses subject matter is that disengagement can be provided between a first component and a second component while eliminating or reducing risk of after-shocks or vibrations, for example as compared with a Marman based system.

Another feature of at least one example of the presently discloses subject matter is that the connector system does not require tangential or circumferential tension loads to be applied at the interface portion between the first component and the second component.

Another feature of at least one example of the presently discloses subject matter is that the connector system can be used for any desired profile of the interface between the first component and the second component: for example, annular, or non-regular, optionally including linear portions.

Another feature of at least one example of the presently discloses subject matter is that the connector system can allow the clamping force to be defined in a precise manner, since the clamping force is in the same direction as the loads between the first component and the second component.

Another feature of at least one example of the presently discloses subject matter is that the connector system enables the axial length of the locking devices to be adjusted, thereby enabling the same type of locking device to be used for interface portions of different thicknesses, and/or allowing different clamping forces to be provided by the same locking device.

Another feature of at least one example of the presently discloses subject matter is that the locking devices of the connector system can be easily calibrated to provide design clamping forces and thereby compensate for manufacturing tolerances.

Another feature of at least one example of the presently discloses subject matter is that the locking devices of the connector system can eliminate or minimize debris resulting from the disengagement of the first component with respect to the second component.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1(*b*) is a fragmented side view of the example of FIG. 1(*a*).

FIG. 2(*a*) is a side view of an alternative example of the example of FIG. 2, in which the first component is a fairing axially disengageable from a prior stage of a launch vehicle; FIG. 2(*b*) is a side view of the example of FIG. 2(*a*), prior to disengagement to the prior stage of the launch vehicle; FIG. 2(*c*) is a side view of an alternative example of the example of FIG. 2, in which the first component and the second components together constitute a fairing, and are laterally disengageable from one another; FIG. 2(*d*) is a side view of the example of FIG. 2(*c*), prior to disengagement from one another.

FIG. 3(*b*) shows in transverse cross-sectional view the example of FIG. 1(*a*) in unlocked configuration.

DETAILED DESCRIPTION

Figure 1A:
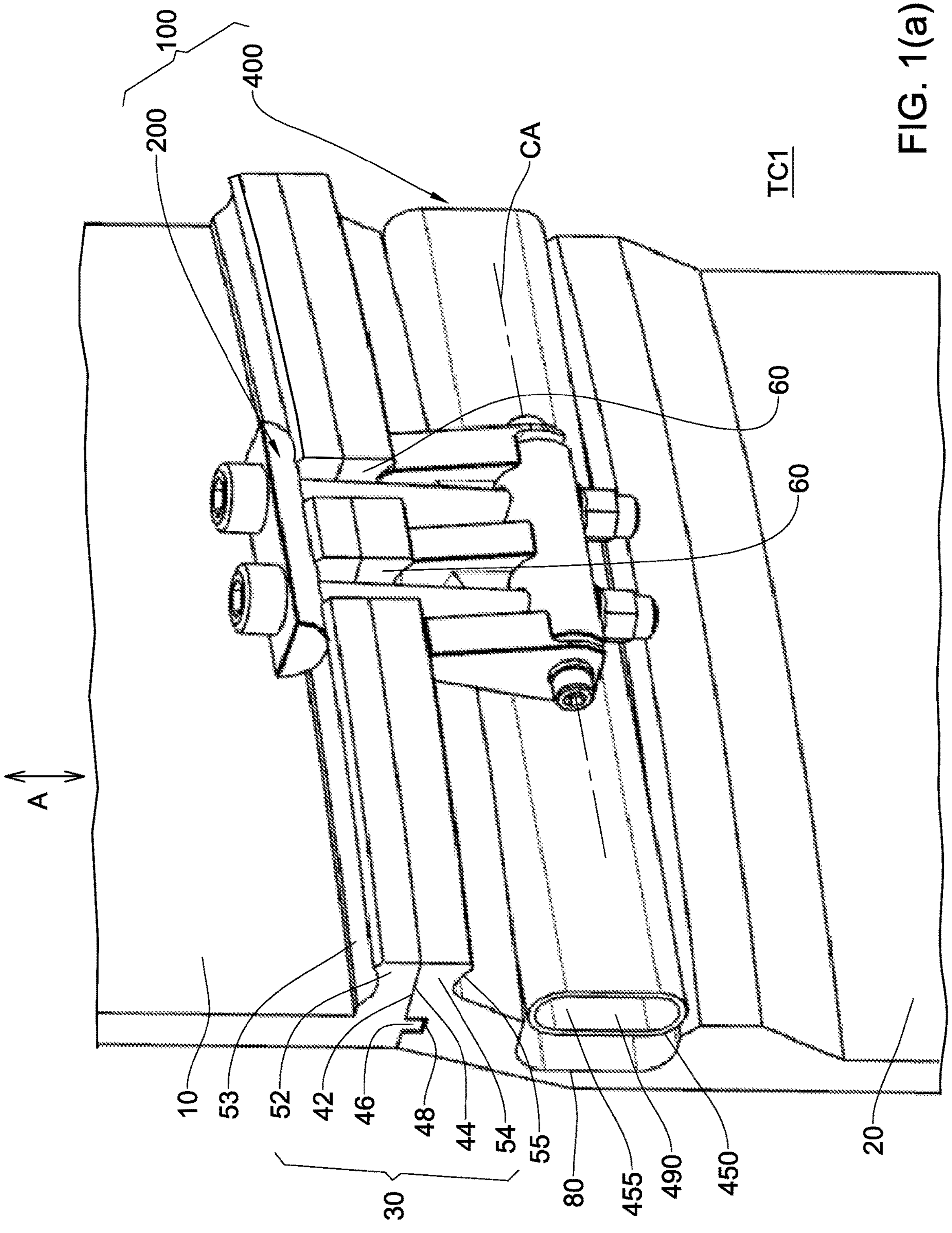
FIG. 1(*a*) is a fragmented isometric view of an example of the connection system according to the presently disclosed subject matter, in locking configuration with respect to a first component and a second component.
Figure 1B:
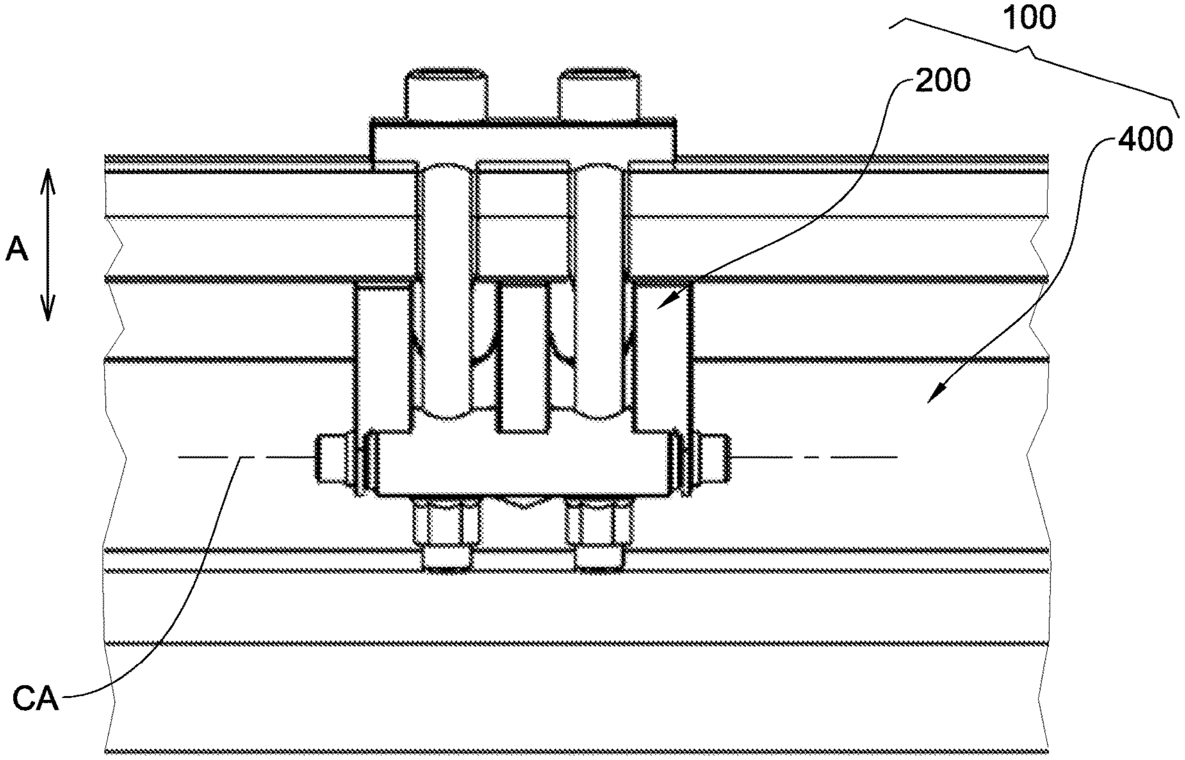

Referring to FIGS. 1(*a*) and 1(*b*), a connection system according to a first example of the presently disclosed subject matter, generally designated 100, comprises at least one locking device 200 and an actuator device 400.

Figure 2:
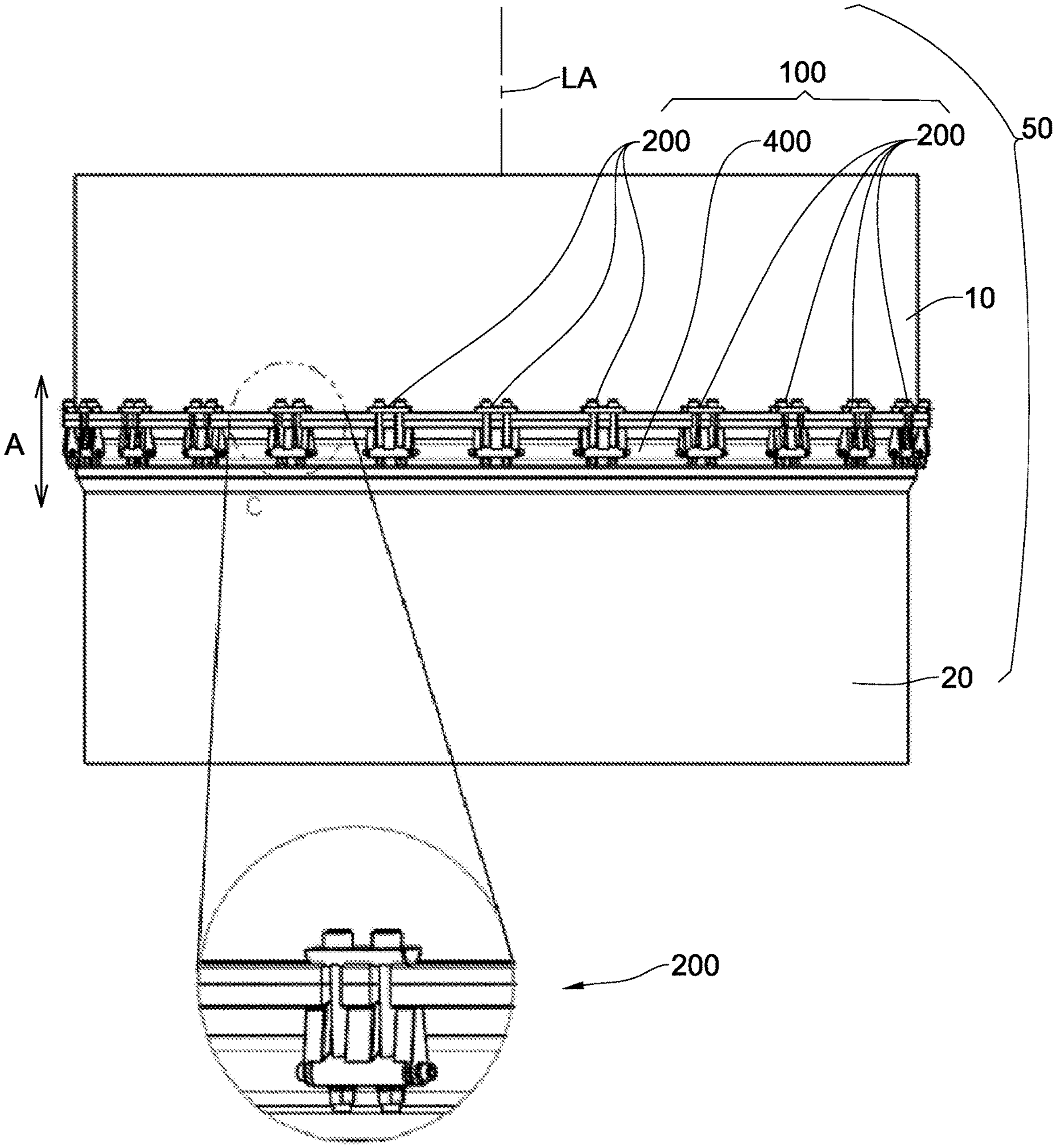
FIG. 2 is a side view of an assembly according to an example of the presently disclosed subject matter, including the example of the connection system of FIG. 1(*a*) and FIG. 1(*b*)
Figure 2A:
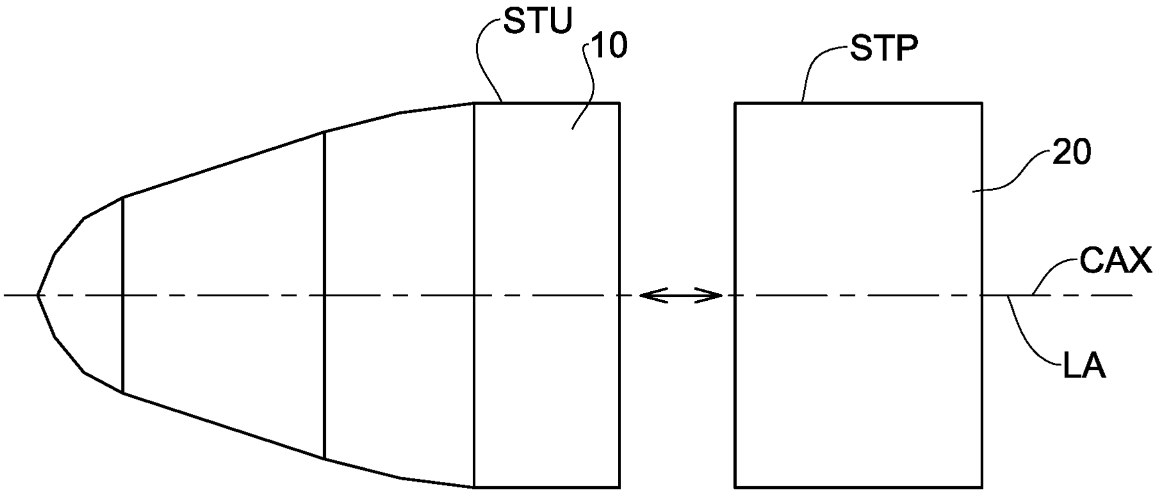
Figure 2B:
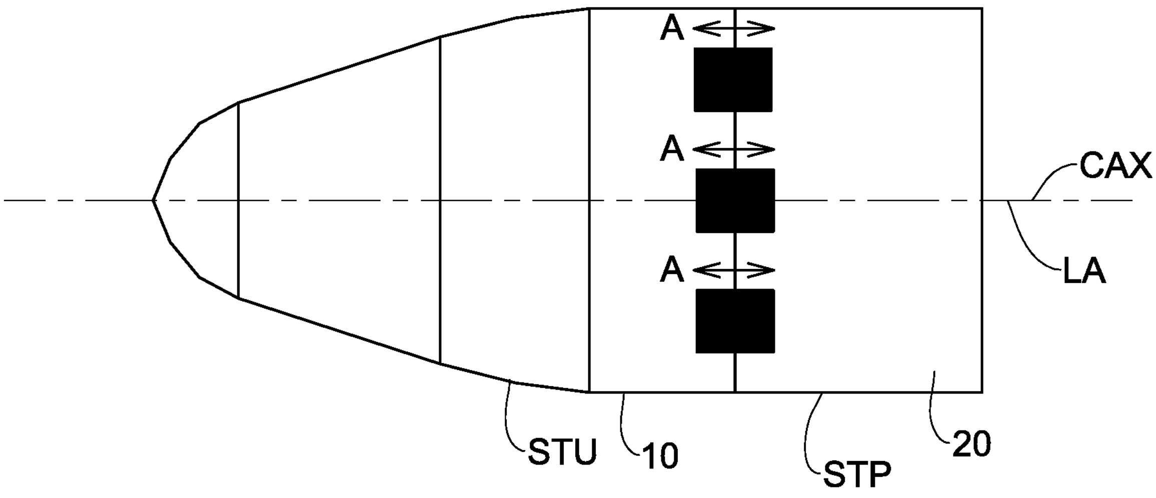
Figure 2C:
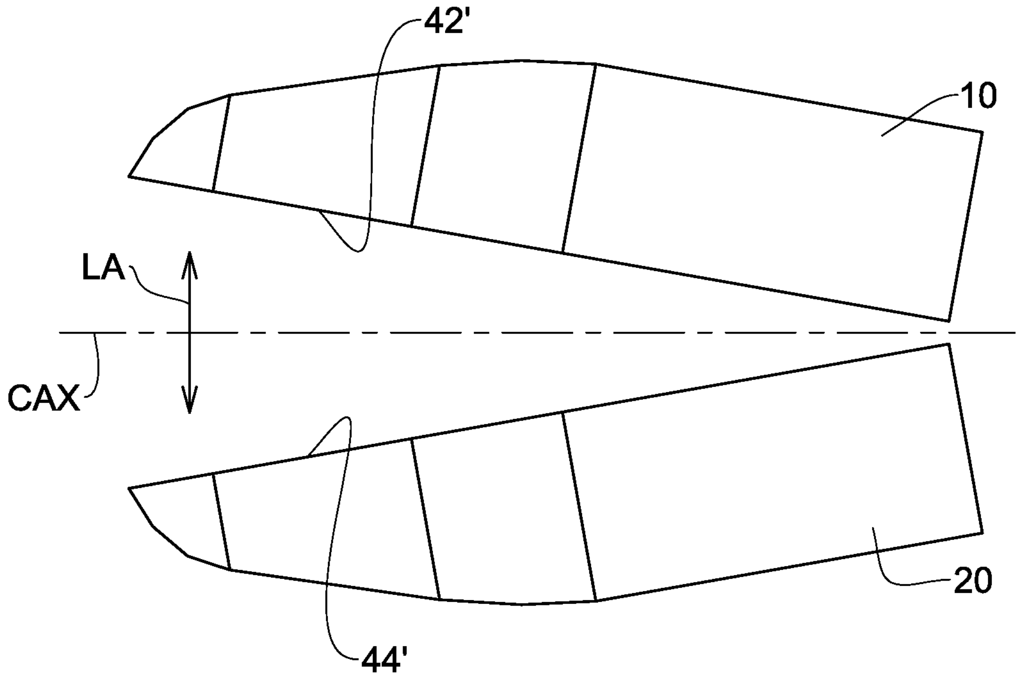
Figure 2D:
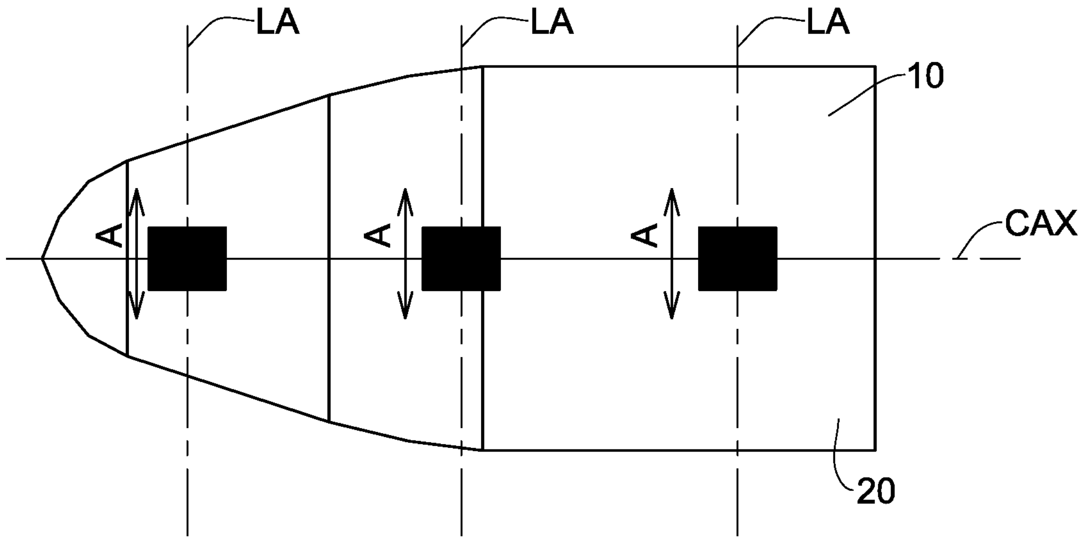

Referring also to FIG. 2, the connecting system 100 is configured for releasably connecting a first component 10 and a second component 20 in a first direction A parallel to a reference longitudinal axis LA. When connected, such that the first component 10 and the second component 20 are releasably clamped to one another via the connection system 100, the connecting system 100, the first component 10 and the second component 20 form an assembly 50.

In at least one example, the first component can be one stage of a rocket launch vehicle, and the second component can be an adjacent stage of the rocket launch vehicle, for example: the first and second stages, respectively of a rocket launch vehicle; or, the second and third stages, respectively of a rocket launch vehicle; or, the third and fourth stages, respectively of a rocket launch vehicle. For example, referring to FIGS. 2(*a*) and 2(*b*), the second component can be the penultimate stage STP of a rocket launch vehicle, and the first component can be the last stage STU of the rocket launch, or, the first component can be a fairing that is provided to protect the payload for the initial stages of the launch. In at least another example, the first component can be a payload carried by a rocket launch vehicle, and the second component can be an adjacent stage of the rocket launch vehicle; for example, the payload can be one or more satellites. In at least another example, the first and second components are each fairing halves, and can together provide a fairing that is provided to protect a payload for the initial stages of the launch.

In at least some such examples, for example, and referring to FIGS. 2, 2(*a*) and 2(*b*), the reference longitudinal axis LA can be coaxial or parallel to a central longitudinal axis CAX of the rocket launch vehicle, or the common central longitudinal axis CAX of the adjacent stages, or of one of the stages thereof. In yet other examples, and referring to FIGS. 2(*c*) and 2(*d*), the reference longitudinal axis LA can be orthogonal to a central longitudinal axis CAX of the rocket launch vehicle or of the fairing itself.

While in some applications of the presently disclosed subject matter the connecting system 100 is only required to have a single locking device 200, in other such applications the connecting system 100 can instead have a plurality of locking devices 200, and one or more actuator devices 400.

In some applications of the presently disclosed subject matter, and as illustrated in FIGS. 1(*a*), 1(*b*), and 2 for example, the connecting system 100 can be provided on external portions of the first component 10 and second component 20. Conversely, in other alternative applications of the presently disclosed subject matter, the connecting system 100 can be provided on internal portions of the first component and of the second component.

For example, in the example illustrated in FIG. 2, the locking system 100 is configured for releasably connecting and locking together a first component 10 and a second component 20, in which by way of non-limiting example the first component 10 and the second component are generally cylindrical, and coaxially aligned about the common longitudinal reference axis LA. The locking system 100 comprises a single actuator device 400 configured for concurrently activating a plurality of said locking devices 200. In at least this example, the locking system 100 comprises a single actuator device 400 configured for concurrently activating all said locking devices 200 of the plurality of locking devices 200. In alternative variations of this example, the locking system 100 comprises a number of actuator devices 400 (for example 2, 3, 4, or more than 4 actuator devices 400), and each actuator device 400 is configured for concurrently activating all said locking devices 200 of a set of 1, 2, 3, 4 or more than 4 locking devices 200.

In alternative variations of this example, at least one of the first component 10 and the second component 20 is cylindrical, and/or, at least one of said first component 10 and the second component 20 is frustro conical.

In yet other alternative variations of this example, the first component 10 and the second component 20 are each fairing parts in the form of fairing halves, and are releasably engaged together with the system 100 to provide the complete fairing. In yet other alternative variations of this example, the complete fairing can be made from a plurality of fairing parts or segments that are adjacently connected together, in a transverse and/or longitudinal direction, for example. In such a case, the first component and the second component 20 are each in the form of such fairing parts or segments that are releasably engaged together with the system 100 to provide a unit of two engaged fairing segments. Such a unit can in turn be releasably engaged to other such fairing parts or segments, each time using a system 100.

In at least such examples, the locking devices 200 are circumferentially or peripherally equi-spaced with respect to the clamping interface 30, about the common longitudinal reference axis LA. However, in at least some alternative variations of these examples, the locking devices 200 are not equi-spaced circumferentially or peripherally with respect to the clamping interface 30, about the common longitudinal reference axis LA; rather the spacing between adjacent locking devices 200 can vary in such examples.

Referring in particular to FIG. 1(*a*), the clamping interface 30 comprises a first clamping part 32, provided at the bottom end of the first component 10, and a second clamping part 34, provided at the upper end of the second component 20. The first clamping part 32 and the second clamping part 34 have mating first and second abutment surfaces 42, 44, respectively, that are in abutment when the first component is clamped with respect to the second component 20.

In at least this example the clamping interface 30 is further configured for mechanically facilitating co-axial alignment between the first component 10 and the second component 20, and comprises an annular groove 48 recessed from the second abutment surface 44, and a complementary annular ring 46 projecting from the first abutment surface 42. Thus, when the first component 10 and the second component 20 are in abutting contact, the annular ring 46 is received in the annular groove 48, and any relative movement orthogonal to the common longitudinal reference axis LA is prevented.

In at least this example, the first and second abutment surfaces 42, 44, respectively, are nominally annular. However, according to an aspect of the presently disclosed subject matter, the clamping interface, and in particular the respective first and second abutment surfaces thereof, can have any suitable shape, for example any circular or non-circular shape. For example, in the example of FIGS. 2(*c*) and 2(*d*), the respective first abutment surface 42' and the second abutment surface 44' can be ogive-shaped. In yet other examples, the respective first and second abutment surfaces thereof can have linear portions and/or curved portions, for example.

As will become clearer herein, the clamping interface 30 further comprises a first concave abutment shoulder 52 provided in the first component 10, and second concave abutment shoulder 54 provided in the second component 20.

The first concave abutment shoulder 52 is in the form of a flange projecting laterally from the first component 10 and includes a lateral projection of the first abutment surface 42. The first concave abutment shoulder comprises a first concave portion 53 facing away from the first abutment surface 42.

The second concave abutment shoulder 54 is in the form of a flange projecting laterally from the second component 20 and includes a lateral projection of the second abutment surface 44. The second concave abutment shoulder comprises a second concave portion 55 facing away from the second abutment surface 44.

In this example, the first concave abutment shoulder 52 and the second concave abutment shoulder 54 are each in the form of an annular flange, generally following the annular contour of the first and second abutment surfaces 42, 44, respectively, which in this example are also annular.

However, in alternative variations of this example, in which the first and second abutment surfaces are not annular per se, the first concave abutment shoulder 52 and the second concave abutment shoulder 54 are each in the form of a flange, generally following the profile or contour of the respective first and second abutment surfaces.

In any case, the clamping interface 30, in particular the first concave abutment shoulder 52 and the second concave abutment shoulder 54, defines a minimum width WX between the first concave portion 53 and the first concave portion 55 in a direction parallel to the reference longitudinal axis LA. The clamping interface 30, in particular the first concave abutment shoulder 52 and the second concave abutment shoulder 54, also defines a maximum width WT between the free edges 58, 59 respectively, of the first concave abutment shoulder 52 and the second concave abutment shoulder 54 in a direction parallel to the reference longitudinal axis LA.

Figure 3A:
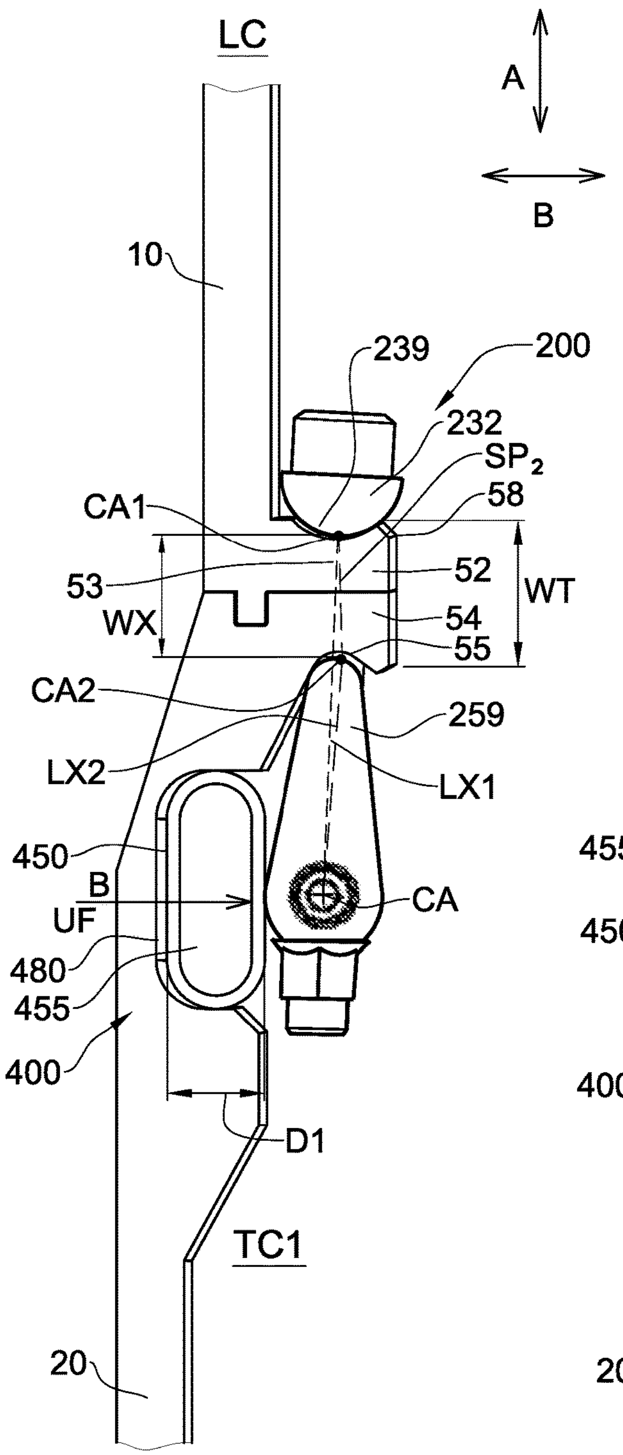
FIG. 3(*a*) shows in transverse cross-sectional view the example of FIG. 1(*a*) in locked configuration.
Figure 3B:
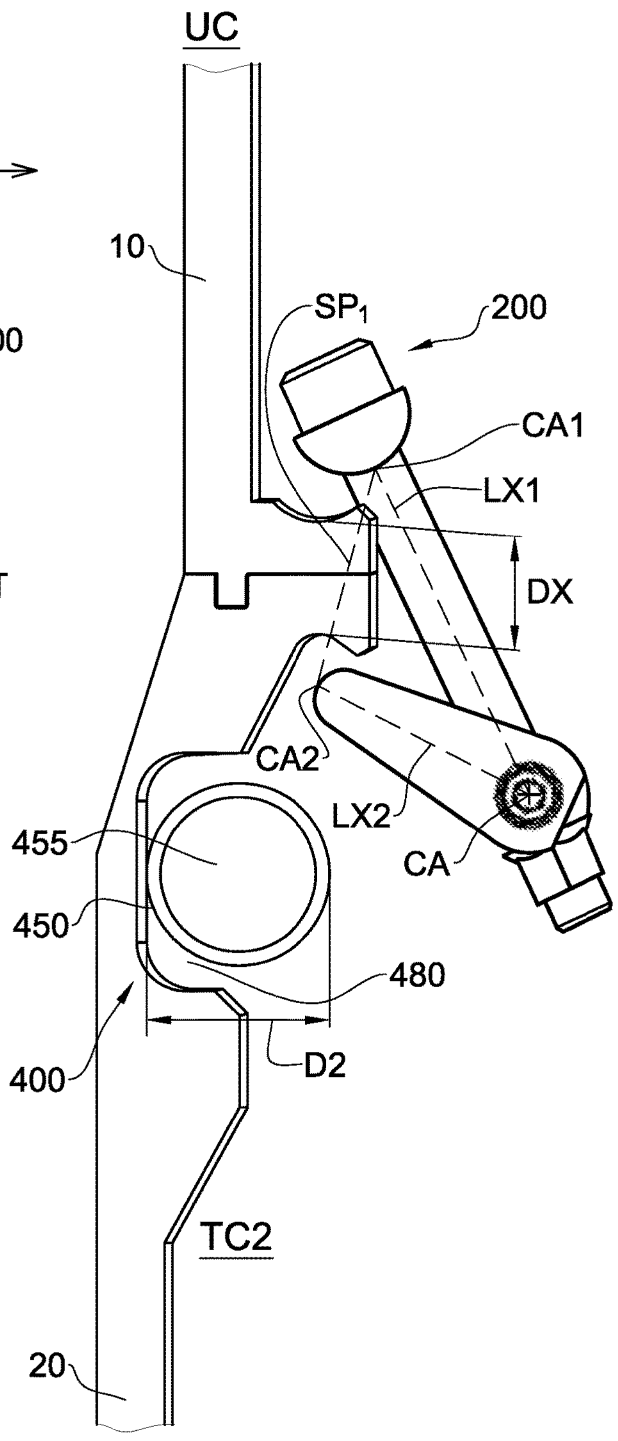

Referring also to FIGS. 3(*a*) and 3(*b*), and as will become clearer herein, each locking device 200 has a geometrically locked configuration LC and an unlocked configuration UC (also interchangeably referred to herein as the release configuration).

In the geometrically locked configuration LC the locking device 200 is capable of reversibly clamping, and reversibly geometrically locking together, the first component 10 and the second component 20 in a mutually clamped relationship along the aforesaid first direction A.

Figure 4:
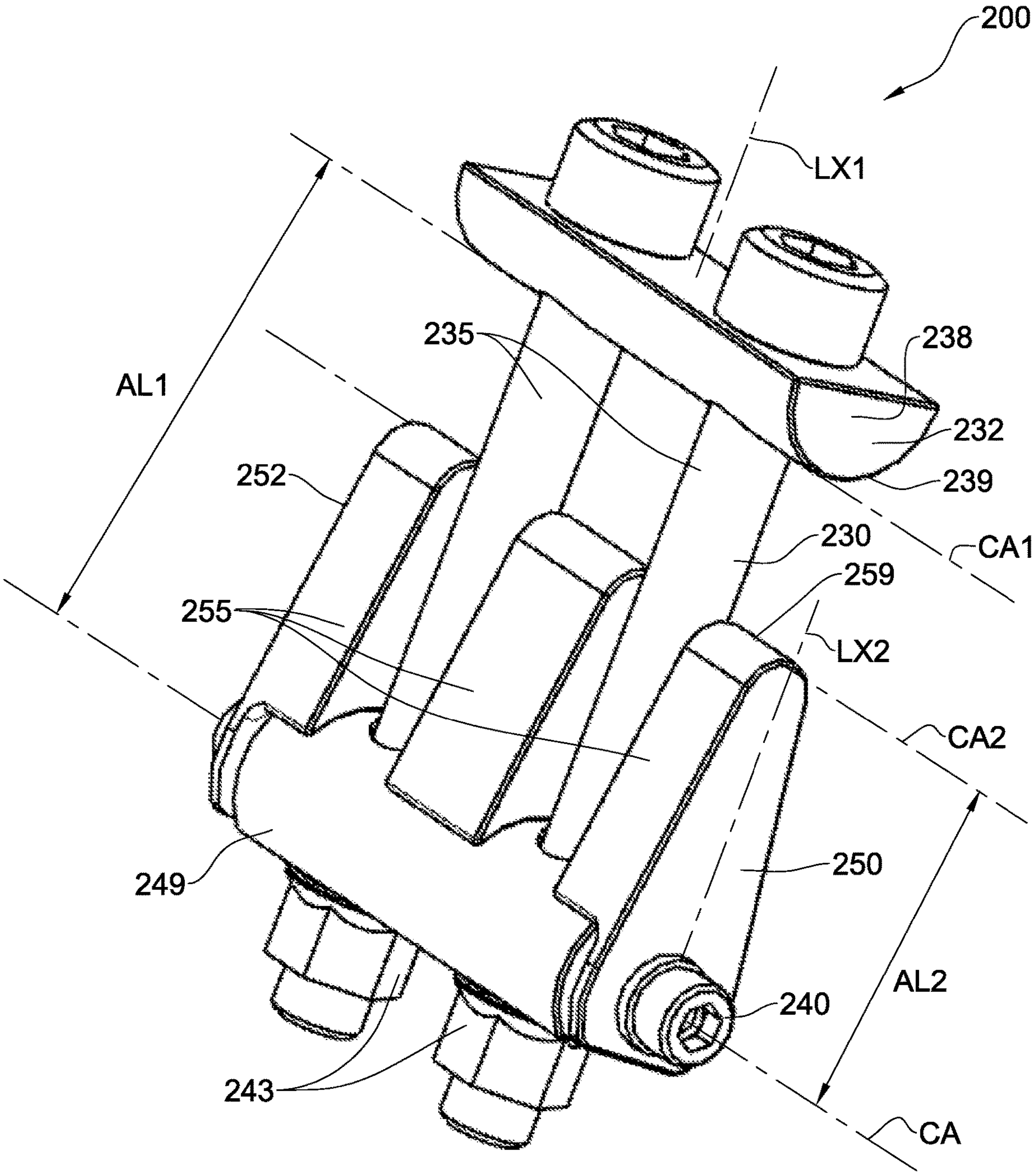
FIG. 4 shows in isometric view a locking device of the example of FIG. 1(*a*).

Also as will become clearer herein, and referring also to FIG. 4, each said locking device 200 comprises a multi-bar linkage assembly including at least two linkage elements, for example first linkage element 230 and second linkage element 250, pivotably mounted to one another about a common clamp axis CA. The first linkage element 230 defines a longitudinal first linkage axis LX1, and the second linkage element 250 defines a longitudinal second linkage axis LX2.

Also as will become clearer herein, in the geometrically locked configuration the linkage elements 230, 250 are in a respective over-center position OCP.

In at least this example, the first linkage axis LX1 and the second linkage axis LX2 are each orthogonal to the common clamp axis CA.

In at least this example, the first linkage element 230 has a free first end 232 configured for pivotably coupling with the first component 10 about a first clamp axis CAL.

The first clamp axis CA1 is orthogonal to the first linkage axis LX1.

In at least this example, the second linkage element 250 has a free second end 252 configured for pivotably coupling with the second component 20 about a second clamp axis CA2. The second clamp axis CA2 is orthogonal to the second linkage axis LX2.

The first clamp axis CA1 and the second clamp axis CA2 are parallel to one another and parallel with the common clamp axis CA.

In at least this example, the first linkage element 230 comprises two first rods 235 (also interchangeably referred to herein as first bars) in mutually parallel configuration to one another. Similarly, the second linkage element 250 comprises three second rods 255 (also interchangeably referred to herein as second bars) in mutually parallel configuration to one another. The two first rods 235 are pivotably mounted with respect to the three second rods 255 at the aforesaid common clamp axis CA via a common pivot pin 240.

In at least this example, the two first rods 235 are intercalated between the three second rods 255.

The two first rods 235 are rigidly joined to one another in the respective mutually parallel configuration via a first pivot member 238 and a second pivot member 249.

Referring again to FIG. 1(*a*), it is to be noted that the clamping interface 30 further comprises a plurality of sets of slots 60, corresponding to the number of locking devices 200 in the system 100. Each set of slots 60 comprises two slots 60 configured for enabling the respective two first rods 235 of each respective locking device 200 to be accommodated therein in the locked configuration LC, as will become clearer herein. Each slot 60 is formed in the first concave abutment shoulder 52 and the second concave abutment shoulder 54, and projects inwardly in a lateral manner from the free edges 58, 59 respectively, of the first concave abutment shoulder 52 and the second concave abutment shoulder 54 in a direction orthogonal to the reference longitudinal axis LA.

Figure 5:
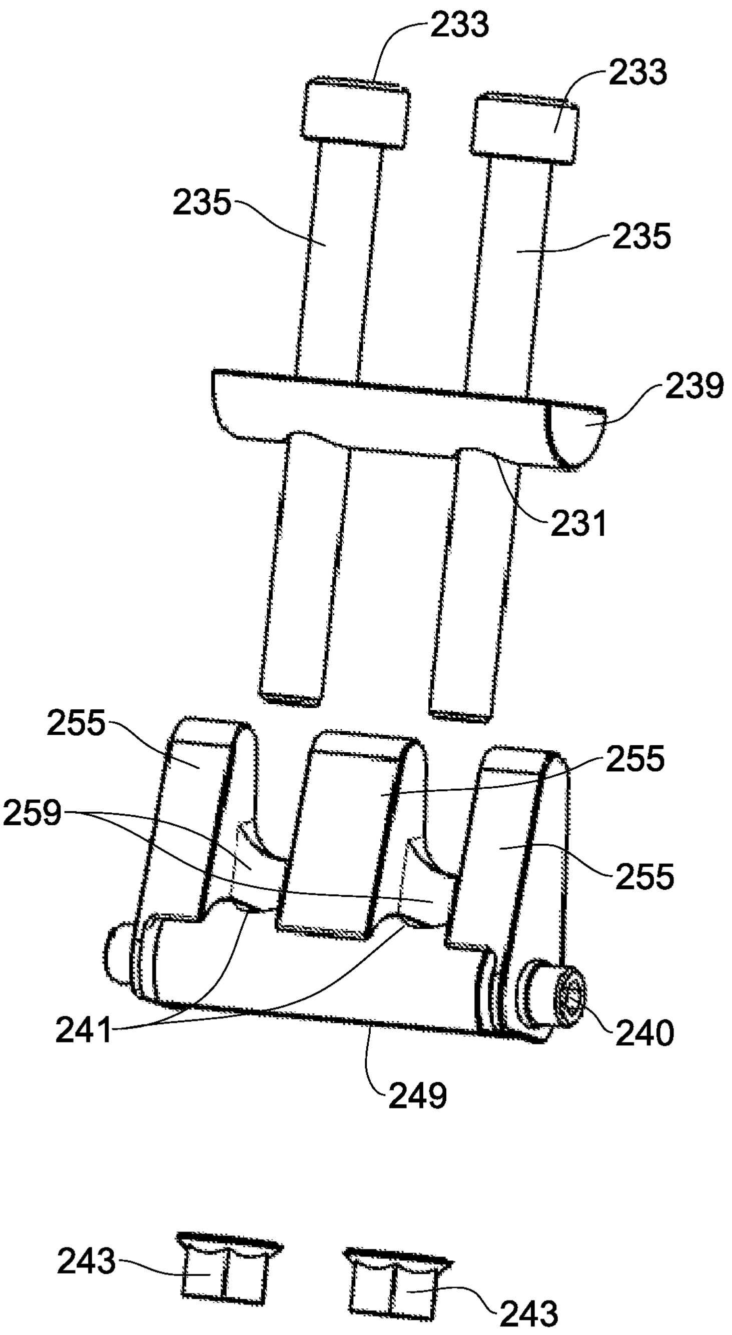
FIG. 5 shows in exploded isometric view a locking device of the example of FIG. 1(*a*).

Referring also to FIG. 5, the first pivot member 238 defines the free first end 232, and has a generally prismatic form along first clamp axis CA1. The pivot member 238 is rigidly connected, in orthogonal spatial relationship, to the two first rods 235 via apertures 231 and end stops 233.

The second pivot member 249 is axially spaced from the first pivot member 238, and is rigidly connected, in orthogonal spatial relationship, to the two first rods 235 via apertures 241 and end screws 243.

As will become clearer herein, the end screws 243 can be screwed along the length of the two first rods 235 to thereby shorten or lengthen the axial spacing between the common clamp axis CA and the first clamp axis CA1. This enables the axial length of the locking device to be adjusted, thereby enabling the same type of locking device 200 to be used for interface portions 30 having a range of different thicknesses, in particular a range of respective minimum widths WX, and/or allows a range of different clamping forces to be provided by the same locking device 200 when engaged with the interface 30. Furthermore, the adjustable axial length between the common clamp axis CA and the first clamp axis CA1 also allows the locking device 200 of the connector system to be easily calibrated to provide design clamping forces and thereby compensate for possible manufacturing tolerances.

The three second rods 255 are rigidly joined to one another in the respective mutually parallel configuration via interconnecting web members 259. As will become clearer herein, the web members 259 also act as a mechanical stop, configured for limiting pivoting of the first linkage element 230 with respect to the second linkage element 250 about the common pivot axis CA.

The second pivot member 249 is pivotably mounted with respect to the three second rods 255 about common clamp axis CA via the common pin 240.

As best seen in FIG. 3(*a*), the free first end 232, defined by the first pivot member 238, has a convex first curved cross section 239, which is generally complementary to the first concave abutment shoulder 52 provided in the first component 10, in particular complementary to the first concave portion 53 thereof.

The free second end 252 has a convex second curved cross section 259, which is generally complementary to the second concave abutment shoulder 54 provided in the second component 20, in particular complementary to the second concave portion 55 thereof.

The first linkage member 230, in particular the first rods 235, have a first axial length AL1, defined between the common axis CA and the first clamp axis CA1, along first linkage axis LX1. While in this example the first axial length AL1 is selectively adjustable in a direction parallel to the first linkage axis LX1 (via the screws 243), in alternative variations of this example, the first linkage length AL1 is fixed.

The second linkage member 250, in particular the second rods 255, have a second axial length AL2, defined between the common axis CA and the second clamp axis CA2, along second linkage axis LX2. While in this example the second axial length AL2 is fixed, in alternative variations of this example the second axial length AL2 is selectively adjustable in a direction parallel to the second linkage axis LX2.

In alternative variations of this example, the first linkage element comprises a single first rod, and/or the second linkage element comprises a single second rod. In yet other alternative variations of this example, the first linkage element comprises a single or a plurality of first rods, and/or, the second linkage element comprises a single or a plurality of first rods.

In at least this example, the first axial length AL1 is greater than the second axial length AL2. In particular, the first axial length AL1 exceeds the second axial length AL2 by a dimension DX, which corresponds to the width WX of the clamping interface 30 between the first concave portion 53 and the first concave portion 55 in a direction parallel to the reference longitudinal axis LA.

Figure 6:
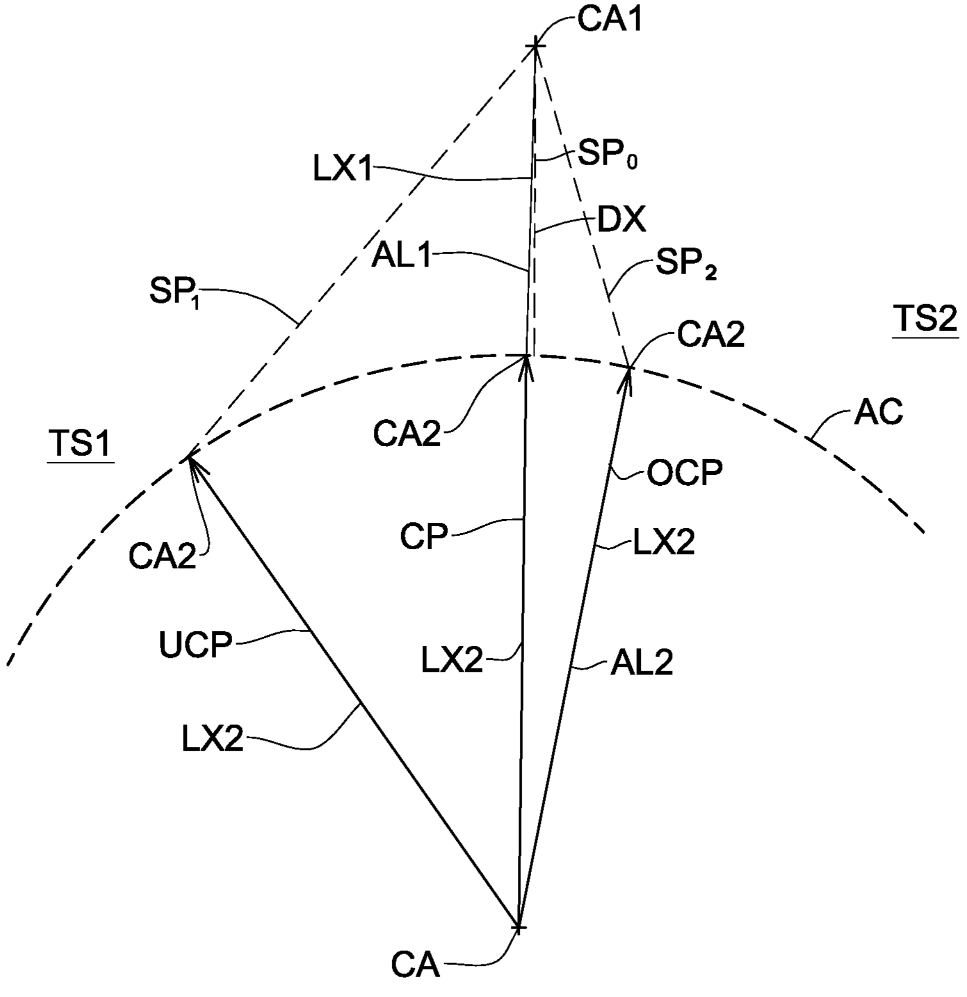
FIG. 6 schematically illustrates spatial relationships between various elements of the locking device of the example of FIG. 1(*a*) in over-center position, center position, and under-center position.

Referring to FIG. 6, the second linkage element 250 can pivot about common clamp axis CA with respect to the first linkage element 230 such that the second clamp axis CA2 circumscribes an arc AC centered on common clamp axis CA. In particular, the second linkage element 250 can pivot about common clamp axis CA with respect to the first linkage element 230 between an under-center position UCP, a center position CP and an over-center position OCP.

In the center position CP, the first linkage axis LX1 and the second linkage axis LX2 are in alignment—parallel to one another, and more particularly co-axial with one another. In this position, the first clamping axis CA1 and the second clamping axis CA2 are at a minimum spacing $SP_0$ with respect to one another, corresponding to the aforesaid dimension DX.

In the under-center position UCP, the first linkage axis LX1 and the second linkage axis LX2 are not in alignment with respect to one another, and are pivoted in a counter-clockwise direction (in the view shown in FIGS. 3(*a*) and 3|(b), and in FIG. 6) with respect to one another. Pivoting in this direction can be up to 90° or greater, for example. In this position, the first clamping axis CA1 and the second clamping axis CA2 can be maximally spaced, and can provide a first spacing SP1 with respect to one another, significantly greater than the aforesaid dimension DX. Furthermore, the first spacing SP1 is also sufficiently large to enable the locking device 200 to be clamped in position at the clamping interface 30, as will become clearer herein.

In the over-center position OCP, the first linkage axis LX1 and the second linkage axis LX2 are also not in alignment with respect to one another, and are pivoted in a clockwise direction (in the view shown in FIGS. 3(*a*) and 3(*b*), and in FIG. 6) with respect to one another. Pivoting in this direction is limited by the mechanical stop, which at least in this example is provided by the webs 259, and can be limited to about 10° or 20°, for example. In this position, the first clamping axis CA1 and the second clamping axis CA2 are spaced at a second spacing SP2 with respect to one another, significantly greater than the aforesaid dimension DX (and thus significantly greater than the respective minimum width WX), but typically less than the first spacing SP1. In particular second spacing SP2 is less than the aforesaid maximum width WT. Furthermore, the second spacing SP2 is not sufficiently large to enable the locking device 200 to be removed from the clamping interface 30, as will become clearer herein. Rather, at the second spacing SP2, the locking device 200 when engaged with the interface 30, is geometrically clamped and locked in the locked configuration LC, as will become clearer herein.

Thus, and referring again to FIG. 6, in the unlocked configuration UC the second clamp axis CA2 is at the under-center position UCP defined on a first transverse side TS2 of at the geometrically locked configuration LC, the second clamp axis CA2 is at the over-center position OCP defined on a first transverse side TS1 of the first linkage axis LX1 (i.e., the first linkage axis LX1 being essentially an imaginary line orthogonally intersecting said first clamp axis CA1 and the common clamp axis CA), and wherein in the geometrically locked configuration LC, the second clamp axis CA2 is at the over-center position OCP defined on a second transverse side TS2 of the first linkage axis LX1, wherein said first side and said second side are on opposite transverse sides of said imaginary line.

In at least this example, the second clamp axis CA2 is intermediately positioned with respect to the first clamp axis CA1 and the common clamp axis CA, at least in the over-center position OCP. This provides a relative compact configuration in the first direction A, and also enables the minimum width WX to be relatively short.

However, in alternative variations of this example, the common clamp axis CA is instead intermediately positioned with respect to the first clamp axis CA1 and the second clamp axis CA2, least in the respective over-center position OCP. This provides a relatively larger minimum width WX.

Referring again to FIG. 3(*a*), in the locked position LP, the free first end 232 is in abutting engagement with the first concave portion 53, and the free second end 259 is in abutting engagement with the second concave portion 55, such that the second linkage axis LA2 is at the over-center position OCP with respect to the first linkage axis LAL.

To reach this position, the locking device 200 is first manipulated to adopt the under-center position UCP, such that the first clamping axis CA1 and the second clamping axis CA2 are spaced at a first spacing SP1 with respect to one another, sufficient to enable engaging the free first end 232 with the first concave portion 53, and the free second end 259 with the second concave portion 55.

Then, in this position the second linkage axis LA2 is pivoted with respect to the first linkage axis LA1 in a counterclockwise direction (as seen in FIGS. 3(*a*) and 3(*b*), and in FIG. 6) until the center position CP is reached. In this position, the clamping force in the direction A is at a maximum.

Thereafter the second linkage axis LA2 is further pivoted with respect to the first linkage axis LA1 in the same direction (i.e., in the same counterclockwise direction as seen in FIGS. 3(*a*) and 3(*b*), and in FIG. 6) until the over-center position OCP is reached. In this position, the clamping force in the direction A is at less than the aforesaid maximum. In this position, the first clamping axis CA1 and the second clamping axis CA2 are spaced at a second spacing SP2 with respect to one another, which is greater than the minimum width WX.

In such an over-center position OCP, the second linkage element 250 cannot pivot any further in a counterclockwise direction (as seen in FIGS. 3(*a*) and 3(*b*), and in FIG. 6) with respect to the first linkage element 230 because of the mechanical stop provided by webs 259. Thus, this mechanical stop (as well as the geometry of the interface 30) prevents the spacing between the first clamping axis CA1 and the second clamping axis CA2 to become sufficiently large as to enable disengagement of the locking device 200 from the interface with further pivoting in the same direction.

Thus, the locking device 200 remains locked in the locked position LC until the second linkage element 250 can be pivoted in a reverse direction (i.e., clockwise direction as seen in FIGS. 3(*a*) and 3(*b*), and in FIG. 6) past the center position CP to the under-center position UCP.

It is to be noted that, optionally, the first axial length AL1 can be adjusted. For example shortened, after the over-center position OCP is attained, for example using the screws 243. This can have the effect to increasing further the axial force applied by the locking device 200 between the first component 10 and the second component 20.

It is to be noted that, without being bound by theory, any attempt to compel the second linkage element 250 to pivot in a reverse direction, by applying a longitudinal force (i.e., parallel to direction A) will not be expected to work, as in order to pivot from the over-center position OCP to the center position CP and beyond to the under-center position UCP will first require the axial force supported by the locking device 200 to first increase to the aforesaid maximum.

On the other hand, and according to an aspect of the presently disclosed subject matter, a relatively small force applied (or having a significant force component) laterally at the common axis CA (i.e., along the reference transverse axis, for example orthogonal to the reference longitudinal axis LA and orthogonal to the clamp axis CA) can quickly transit the locking device 200 from the over-center position OCP through the center position CP and to the under-center position UCP, mainly due to the relatively large moment arm provided by the second axial length AL2.

Thus, and according to an aspect of the presently disclosed subject matter, the actuator device 400 is configured for transitioning the locking device 200 from the geometrically locked configuration LC to the unlocked configuration UC by selectively applying to the locking device 200 an unlocking force UF directly to the linkage elements 230, 250 at the common clamp axis CA, in a second direction B parallel to a reference transverse axis TA, whereby to cause the respective common clamp axis CA to be released from the over-center position OCP and into the under-center position UCP.

The reference longitudinal axis LA and the reference transverse axis TA are non-parallel with respect to one another. In particular, the reference transverse axis TA is generally orthogonal to the reference longitudinal axis LA.

It is to be noted that the wherein said actuator device 400 is mechanically distinct from the locking device(s) 200. In other words, the actuator device 400 is not mechanically coupled with the locking device(s) 200 at least in the unlocked configuration UC, and furthermore, each locking device 200 is transitioned from the unlocked configuration UC to the geometrically locked configuration LC independently from, and without any mechanical interaction with, the actuator device 400.

Thus, in the geometrically locked configuration LC, or in operation of the system 100 to transit each locking device 200 to the geometrically locked configuration LC, the actuator device 400 is mechanically uncoupled with respect to each locking device 200.

In other words, the actuator device 400 is not, or does not need to be, mechanically mounted to each locking device 200, or the actuator device 400 is not required in any way for enabling each locking device 200 to attain the respective locked configuration CG.

Thus, the actuator device 400 is not a part of the locking device 200, and is instead configured for selectively unlocking the locking device 200 from the locked configuration LC to the unlocked configuration UC.

Nevertheless, in at least this example, in the geometrically locked configuration LC, the actuator device 400 is a mutually abutting relationship with respect to the locking device 200, or is at least in very close proximity thereto.

Referring again to FIGS. 1(*a*), 1(*b*), 3(*a*) and 3(*b*), the actuator device 400 comprises a tube element 450 configured for shape-morphing from a first tube configuration TC1 having a first tube dimension D1 parallel to the second direction B, and a second tube configuration TC2 having a second tube dimension D2 parallel to the second direction B. in particular, the first tube dimension D1 and the second tube dimension D2 correspond to parts of the tube element 450 at or in proximity to the reference transverse axis TA.

The second tube dimension D2 is significantly greater than the first tube dimension D1.

For example, in the first tube configuration TC1, the tube element 450 has a generally flattened circle cross-sectional shape, while in the second tube configuration TC2, the tube element 450 has a generally circular cross-sectional shape.

According to an aspect of the presently disclosed subject matter, the actuator device 400 is configured for providing such a second tube dimension D2, in particular a tube wall displacement ΔD(=D2−D1) that is sufficient to concurrently displace the respective common clamp axis CA from the respective over-center position OCP, past the center position CP, and for example to the respective under-center position UCP.

In other words, the value of ΔD can be equal to or greater than required lateral displacement of the common clamp axis CA along the second direction B, such as to transition the linkage elements 230, 250 from the over-center position OCP, past the center position CP, and for example to the under-center position UCP.

In at least this example, the actuator device 400 is configured for providing the required second tube dimension D2 in a predetermined short time sufficient to concurrently cause the respective common clamp axis CA to be moved from the respective over-center position OCP to the respective under-center position UCP. For example, such a short time period can be in the order of microseconds, or in the range of a few milliseconds (for example 1 to 10 milliseconds) to a few microseconds (for example 1 to 10 microseconds). This enables the actuator device 400 to operate on the locking devices 200 very quickly, thereby concurrently enabling the first component 10 and the second component 20 to become uncoupled very quickly.

In at least this example, the actuator device 400 comprises a pyrotechnic system 490 for selectively morphing the shape of the tube element 450 from the first tube configuration TC1 to the second tube configuration TC2 responsive to a suitable activation command. For example, such an activation command can include an electrical, electronic or digital signal, or can include a pyrotechnic shock.

As best seen in FIGS. 1(*a*), 3(*a*) and 3(*b*), the tube element 450 comprises an internal lumen 455, and the pyrotechnic system 490 comprises a linear explosive assembly (not shown) accommodated in the internal lumen 455.

The tub element 450 is accommodated in a circumferential groove 480, provided in the second component 20. The groove 480 provides a mechanical restraint to the tube element 450, so that the full dimensional change from D1 to D2 occurs in the second direction B.

Without being bound to theory, when the actuator device 400 is selectively activated, the respective command signal detonates the linear explosive assembly of the pyrotechnic system 490, resulting in an expansion and resultant morphing of the tube element from a relatively small cross-sectional area to a relatively large cross-sectional area, thereby increasing the transverse dimension from D1 to D2. The amount and type of the explosive materials in the linear explosive assembly can be such as to ensure sufficient deformation of the tube element 450, while not rupturing or otherwise destroying the tube element 450 itself. This can result in the actuator device 400 not contributing to particulate debris after the first component 10 and the second component are uncoupled.

It is to be noted that at least in some alternative variations of this example, the tube element 450 can be flexible and/or elastic, and coupled with a pneumatic source or hydraulic source, such that activation of the actuator device in a pressure build up in the lumen 455, thereby resulting in an expansion and resultant morphing of the tube element from a relatively small cross-sectional area to a relatively large cross-sectional area, thereby increasing the transverse dimension from D1 to D2.

In at least this example, the tube element 450 can be in abutting contact, or spaced by a small spacing, with respect to the respective locking device(s) 200.

In alternative variations of this example, the tube element 450 can be in indirect abutting contact with respect to the respective locking device(s) 200. In such cases, the actuator device 400 can further comprises a mechanical arm, lever, or other mechanism that is located intermediate the tube element 450 and the respective locking device 200, and is configured for applying the release force to the locking device 200 at the common axis CA, responsive to the morphing of the tube element 450.

In at least this example, the connection system 100 comprises a plurality of locking devices 200, wherein all the locking devices 200 are operatively coupled with respect to a single actuator device 400. In other words, a single actuator device 400 is provided, for concurrently actuating all the locking devices 200. In this manner, all the locking devices can be concurrently transitioned to the under-center position UCP to thereby ensure a clean uncoupling between the first component 10 and the second component 20.

The number of locking devices 200 included in any particular application of the connection system 100 depends on the mechanical loads expected between the first component 10 and the second component 20, and on the mechanical properties of the locking devices 200 themselves. In this manner, the number of required locking devices 200 can be matched to any particular application in a relatively straightforward manner, and thus allows the same type of locking devices 200 to be used for many and varied applications.

Figures 7A, 7B, 7C, 7D:
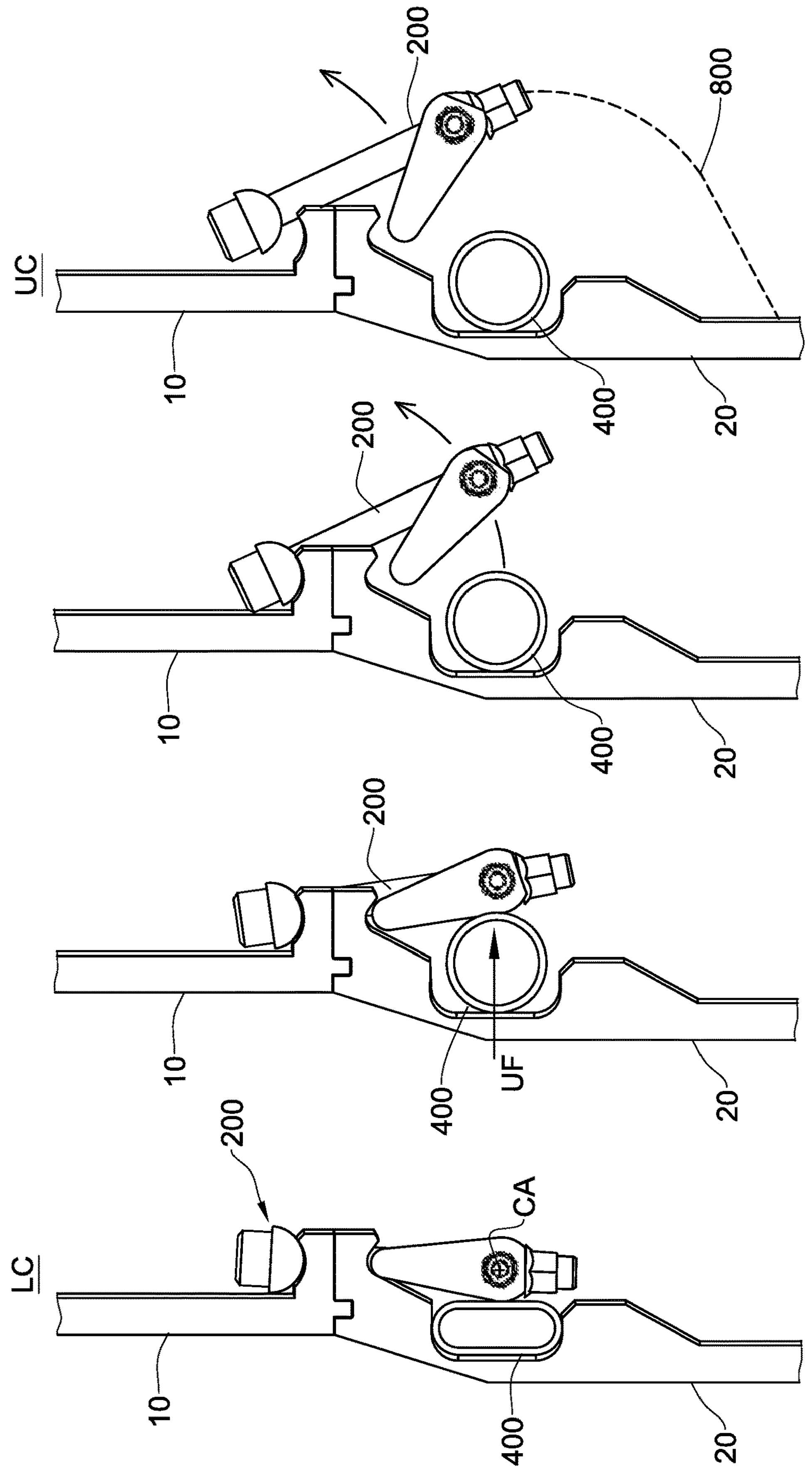
FIGS. 7(*a*), 7(*b*), 7(*c*), 7(*d*) show in fragmented transverse cross-sectional side view operation of the system of the example of FIG. 1(*a*).
Figures 8A, 8B, 8C, 8D:
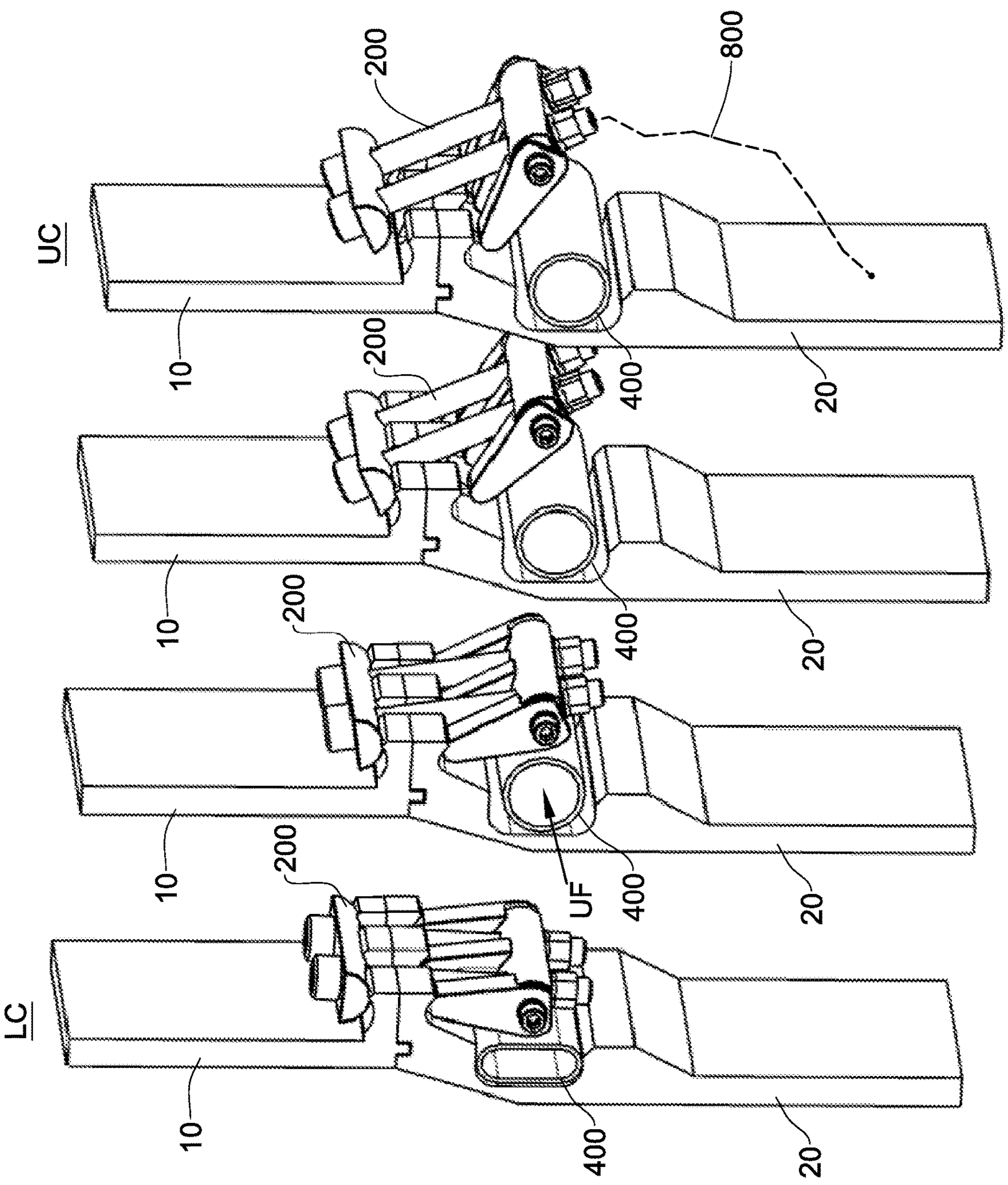
FIGS. 8(*a*), 8(*b*), 8(*c*), 8(*d*) show in fragmented isometric side view operation of the system of the example of FIG. 1(*a*).

Referring also to FIGS. 7(*a*) to 7(*d*), and to FIGS. 8(*a*) to 8(*d*), the locked configuration of one locking device 200 of a system 100 is illustrated in FIGS. 7(*a*) and 8(*a*).

When it is required for the first component 10 and the second component 20 to become uncoupled, a suitable command signal is transmitted to the actuator device 400 (FIGS. 7(*b*) and 8(*b*)), whereupon the pyrotechnic system morphs the tube element 450 to thereby provide the required unlocking force UF to the respective locking devices 200 concurrently, the unlocking force UF being concurrently applied to all the locking devices at the respective common clamp axes CA in the respective direction B. In such a case, each direction B can be radial, originating from the reference longitudinal axis LA, for example. The unlocking force UF transits each locking device 200 to the respective under-center position UCP, completely disengaging the locking device from the interface 30, and thereby terminating the mechanical force keeping the first component 10 axially engaged with the second component 20, and illustrated in FIGS. 7(*c*), 7(*d*), 8(*c*), 8(*d*).

As schematically illustrated in FIGS. 7(*d*) and 8(*d*), the connector system 100 can optionally further comprise a restrainer 800 configured for mechanically coupling the respective locking device 200 to only one of the first component 10 or the second component 20. In the illustrated example, each locking device remains mechanically connected to the second component 20 after disengagement if the first component 10.

This can provide the benefit of minimizing or avoiding generating many independent debris elements resulting from operation of the system 100.

It is thus evident from the above disclosure, that at least the above examples of the connector system do not require tangential or circumferential tension loads to be applied at the interface portion between the first component and the second component.

Without being bound to theory, inventors consider that the connection system of the presently disclosed subject matter does not require large circumferential loads to be applied at the interface portion, and thus there is less stored potential energy during disengagement than, for example a Marman based system, which stored energy could otherwise potentially induce shock and/or vibration when released at disengagement.

In the method claims that follow, alphanumeric characters and Roman numerals used to designate claim steps are provided for convenience only and do not imply any particular order of performing the steps.

Finally, it should be noted that the word “comprising” as used throughout the appended claims is to be interpreted to mean “including but not limited to”.

While there has been shown and disclosed examples in accordance with the presently disclosed subject matter, it will be appreciated that many changes may be made therein without departing from the scope of the presently disclosed subject matter as set out in the claims.

The invention claimed is:

1. A connection system for releasably connecting a first component and a second component in a first direction, the connection system comprising:

at least one locking device having a geometrically locked configuration and an unlocked configuration, wherein in the geometrically locked configuration the locking device is capable of reversibly geometrically locking together the first component and the second component in a mutually clamped relationship along said first direction, each said locking device comprising at least two linkage elements pivotably mounted to one another about a common clamp axis to thereby enable each said linkage element to pivot about the common clamp axis, and wherein in said geometrically locked configuration said at least two linkage elements are in an over-center position; and an actuator device configured for transitioning said at least one locking device from the geometrically locked configuration to the unlocked configuration by selectively applying to each said locking device an unlocking force directly to said linkage elements at the common clamp axis, in a second direction, whereby to cause the at least two linkage elements to pivot with respect to one another about the common clamp axis and thereby cause the at least two linkage elements to be released from the over-center position and into an under-center position, and wherein said first direction and said second direction are non-parallel with respect to one another;

wherein said actuator device comprises a tube element configured for shape morphing from a first tube configuration having a first tube dimension parallel to said second direction, and a second tube configuration having a second tube dimension parallel to said second direction, wherein said second tube dimension is significantly greater than said first tube dimension.

2. The connection system according to claim 1, including one of the following:

wherein said actuator device is mechanically distinct from said at least one locking device;

wherein in said geometrically locked configuration, the actuator device is mechanically uncoupled with respect to the at least one said locking device;

wherein in said geometrically locked configuration, the actuator device is a mutually abutting relationship with respect to the at least one said locking device; or wherein in said geometrically locked configuration, the actuator device is a transverse spaced relationship with respect to the at least one said locking device.

3. The connection system according to claim 1, including at least one of the following:

wherein said tube element is in transverse facing relationship with respect to the common clamp axis, or, wherein the actuator device comprises an actuator arm operatively coupled to the tube element and wherein in said geometrically locked configuration the actuator arm is abutting with, or in a transverse spaced relationship with respect to, the common clamp axis;

wherein said first tube dimension and said second tube dimension correspond to parts of the tube element at or in proximity to a reference transverse axis parallel to the second direction;

wherein in said first tube configuration, the tube element has a generally flattened circle cross-sectional shape, and wherein in wherein in said second tube configuration, the tube element has a generally circular cross-sectional shape;

wherein the actuator device is configured for providing a said second tube dimension that is sufficient to concurrently displace the said linkage elements from said over-center position to said under-center position;

wherein the actuator device is configured for providing a said second tube dimension in a predetermined short time sufficient to concurrently cause said linkage elements to transit from said over-center position to said under-center position; or wherein the actuator device comprises a pyrotechnic system for selectively morphing the shape of the tube element from the first tube configuration to the second tube configuration responsive to a suitable activation command.

4. The connection system according to claim 1, wherein the actuator device comprises a pyrotechnic system for selectively morphing the shape of the tube element from the first tube configuration to the second tube configuration responsive to a suitable activation command, and wherein said tube element comprises an internal lumen, and wherein said pyrotechnic system comprises a linear explosive assembly accommodated in said internal lumen.

5. A connection system for releasably connecting a first component and a second component in a first direction, the connection system comprising:

at least one locking device having a geometrically locked configuration and an unlocked configuration, wherein in the geometrically locked configuration the locking device is capable of reversibly geometrically locking together the first component and the second component in a mutually clamped relationship along said first direction, each said locking device comprising at least two linkage elements pivotably mounted to one another about a common clamp axis, and wherein in said geometrically locked configuration said at least two linkage elements are in an over-center position;

an actuator device configured for transitioning said at least one locking device from the geometrically locked configuration to the unlocked configuration by selectively applying to each said locking device an unlocking force directly to said linkage elements at the common clamp axis, in a second direction, whereby to cause the at least two linkage elements to be released from the over-center position and into a an under-center position, and wherein said first direction and said second direction are non-parallel with respect to one another;

wherein each said locking device comprising a multi-bar linkage assembly comprising said at least two linkage elements, including a first said linkage element and a second said linkage element pivoted with respect to one another about said common clamp axis, the first linkage element having a free first end configured for pivotably coupling with the first component about a first clamp axis, and the second linkage element having a free second end configured for pivotably coupling with the second component about a second clamp axis, wherein in said geometrically locked configuration, said second clamp axis is at said over-center position defined on a second transverse side of an imaginary line orthogonally intersecting said first clamp axis and said common clamp axis, and wherein in said unlocked configuration said second clamp axis is at said under-center position defined on a first transverse side of said imaginary line, wherein said first side and said second side are on opposite transverse sides of said imaginary line.

6. The connection system according to claim 5, including at least one of the following:

wherein said first clamp axis, said second clamp axis and said third clamp axis are parallel to one another;

further comprising a mechanical stop, configured for limiting pivoting of the first linkage element with respect to the second linkage element about said common clamp axis; or wherein said first linkage element comprises a first rod, wherein the second linkage element comprises a second rod, wherein the first rod is pivotably mounted with respect to the second rod at said common clamp axis via a common pivot pin.

7. The connection system according to claim 5, wherein said first linkage element comprises a first plurality of first rods in mutually parallel configuration, wherein the second linkage element comprises a second plurality of second rods in mutually parallel configuration, wherein the first plurality of said first rods is pivotably mounted with respect to the plurality of said second rods at said common clamp axis via a common pivot pin.

8. The connection system according to claim 7, including at least one of the following:

wherein said first rods of said first plurality are rigidly joined to one another in said mutually parallel configuration;

wherein said second rods of said second plurality are rigidly joined to one another in said mutually parallel configuration;

wherein said free first end has a convex first curved cross section, and wherein said free second end has a convex second curved cross section, wherein the first curved cross section is complementary to a first concave abutment shoulder provided in the first component, and wherein the second curved cross section is complementary to a second concave abutment shoulder provided in the second component;

wherein said first rods have a first axial length, defined between said common clamp axis and said first clamp axis, and wherein said first axial length is selectively adjustable;

wherein said first rods are configured for enabling selectively adjusting a clamping force between the first clamp axis and the second clamp axis; or wherein said first plurality of said first rods consists of two said first rods, and wherein said second plurality of second rods consist of three second rods.

9. The connection system according to claim 7, including one of the following:

wherein at least in said over-center position, said second clamp axis is intermediately positioned with respect to said first clamp axis and said common clamp axis; or wherein at least in said over-center position, said common clamp axis is intermediately positioned with respect to said first clamp axis and said second clamp axis.

10. A connection system for releasably connecting a first component and a second component in a first direction, the connection system comprising:

at least one locking device having a geometrically locked configuration and an unlocked configuration, wherein in the geometrically locked configuration the locking device is capable of reversibly geometrically locking together the first component and the second component in a mutually clamped relationship along said first direction, each said locking device comprising at least two linkage elements pivotably mounted to one another about a common clamp axis, and wherein in said geometrically locked configuration said at least two linkage elements are in an over-center position;

an actuator device configured for transitioning said at least one locking device from the geometrically locked configuration to the unlocked configuration by selectively applying to each said locking device an unlocking force directly to said linkage elements at the common clamp axis, in a second direction, whereby to cause the at least two linkage elements to be released from the over-center position and into an under-center position, and wherein said first direction and said second direction are non-parallel with respect to one another;

a restrainer configured for mechanically coupling the at least one locking device to only one of the first component or the second component;

wherein said actuator device comprises a tube element configured for shape morphing from a first tube configuration having a first tube dimension parallel to said second direction, and a second tube configuration having a second tube dimension parallel to said second direction, wherein said second tube dimension is significantly greater than said first tube dimension.

11. The connection system according to claim 1, comprising a plurality of said locking devices, wherein all the locking devices of said plurality are operatively coupled with respect to one said actuator device.

12. An assembly comprising a first component, a second component and a connection system as defined in claim 1, wherein the first component and the second component are releasably clamped to one another via said connection system.

13. The assembly according to claim 12, including at least one of the following:

comprising a plurality of said locking devices, wherein all the locking devices are operatively coupled with respect to one said actuator device;

wherein one said linkage element has a free first end configured for pivotably coupling with the first component about a first clamp axis, and wherein another said linkage element has a free second end configured for pivotably coupling with the second component about a second clamp axis, and wherein said first component comprises a concave first abutment shoulder configured for enabling each said free first end to be pivotably mounted thereto about said first clamp axis, and wherein said second component comprises a concave second abutment shoulder configured for enabling each said free second end to be pivotably mounted thereto about said second clamp axis;

wherein at least one of said first component and said second component is cylindrical or frustro conical;

wherein said first component and said second component are in the form of one or the other of two fairing parts of a fairing; or wherein said first component is stage of a rocket launch vehicle and wherein said second component is an adjacent payload carried by the rocket launch vehicle, or, wherein said first component is one stage of a rocket launch vehicle and wherein said second component is an adjacent stage of the rocket launch vehicle, or, wherein said first component is one fairing part of a fairing of a rocket launch vehicle, and wherein said second component is an adjacent fairing part of the fairing carried by the rocket launch vehicles.

14. A rocket launch vehicle including at least a first stage, an adjacent second stage and a connection system for releasably connecting a first component and a second component in a first direction, the connection system is as defined in claim 1, wherein the first stage is the first component, and wherein the second stage is the second component, and wherein the connection system releasably clamps together the at least first stage and second stage to one another.

15. A rocket launch vehicle including at least one stage, a payload and a connection system for releasably connecting a first component and a second component in a first direction, the connection system is as defined in claim 1, wherein the stage is the first component, and wherein the payload is the second component, and wherein the connection system releasably clamps together the payload and the stage.

16. A rocket launch vehicle including at least a first fairing portion, and a second fairing portion, and a connection system for releasably connecting a first component and a second component in a first direction, the connection system is as defined in claim 1, wherein the first fairing portion is the first component, and wherein the second fairing portion is the second component, and wherein the connection system releasably clamps together the first fairing portion and the second fairing portion.

17. A rocket launch vehicle including at least a first stage, an adjacent second stage and a connection system for releasably connecting a first component and a second component in a first direction, the connection system comprising:

at least one locking device having a geometrically locked configuration and an unlocked configuration, wherein in the geometrically locked configuration the locking device is capable of reversibly geometrically locking together the first component and the second component in a mutually clamped relationship along said first direction, each said locking device comprising at least two linkage elements pivotably mounted to one another about a common clamp axis, and wherein in said geometrically locked configuration said at least two linkage elements are in an over-center position;

an actuator device configured for transitioning said at least one locking device from the geometrically locked configuration to the unlocked configuration by selectively applying to each said locking device an unlocking force directly to said linkage elements at the common clamp axis, in a second direction, whereby to cause the at least two linkage elements to be released from the over-center position and into an under-center position, and wherein said first direction and said second direction are non-parallel with respect to one another, wherein the first stage is the first component, and wherein the second stage is the second component, and wherein the connection system releasably clamps together the at least first stage and second stage to one another;

wherein said first direction is coaxial or parallel to a central longitudinal axis of the rocket launch vehicle or to a common central longitudinal axis of at least one said stage, or, wherein said first direction is orthogonal to a central longitudinal axis of the rocket launch vehicle or to a central longitudinal axis of the fairing; and wherein said actuator device comprises a tube element configured for shape morphing from a first tube configuration having a first tube dimension parallel to said second direction, and a second tube configuration having a second tube dimension parallel to said second direction, wherein said second tube dimension is significantly greater than said first tube dimension.

18. A method for reversibly connecting a first component to a second component, the method comprising:

providing a connection system as defined in claim 1;

engaging the at least one locking device with the first component and the second component, and manipulating the at least one locking device to attain the locked configuration.

19. The method according to claim 18, further comprising activating the actuator device to thereby provide the unlocking force to the at least one locking device, thereby transitioning the at least one locking device to the unlocked configuration, and thereby disengaging the first component from the second component.

* * * * *